March 1, 1927. 1,618,985
B. F. KELLY ET AL
UNIVERSAL MOUNTING
Filed Oct. 17, 1925
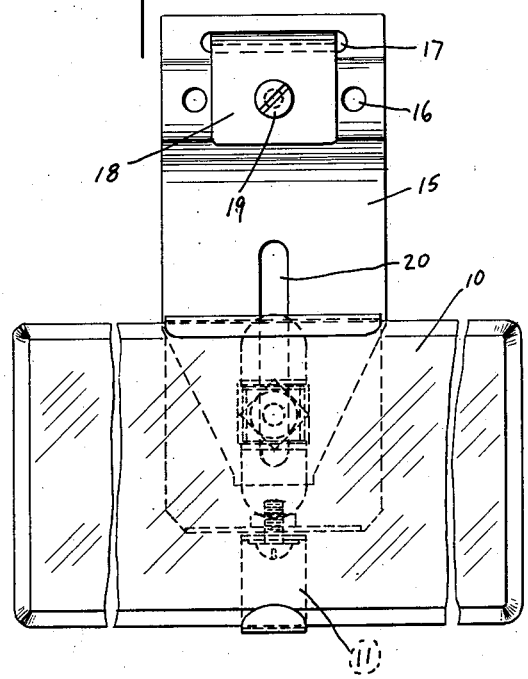
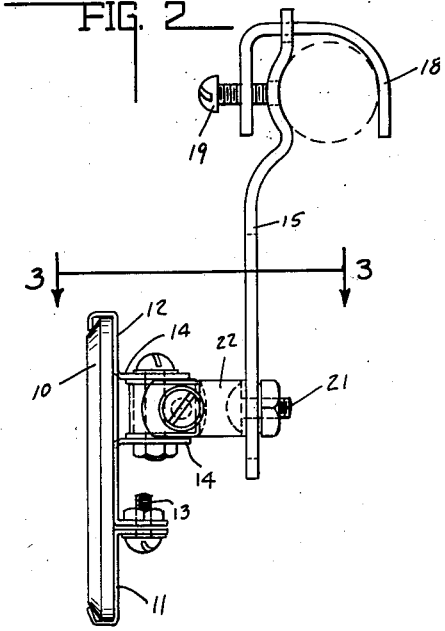
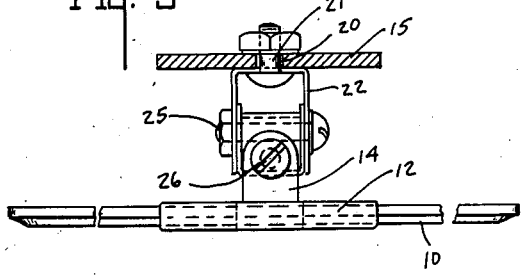
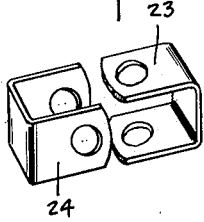
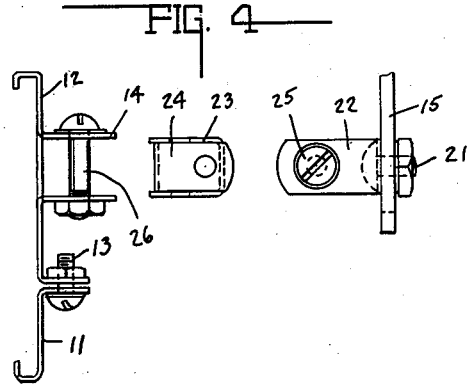
INVENTORS.
BERT F. KELLY.
ROBERT F. MILLER.
LOUIS G. WINKLER.
BY
ATTORNEYS.

Patented Mar. 1, 1927.

1,618,985

UNITED STATES PATENT OFFICE.

BERT F. KELLY, ROBERT F. MILLER, AND LOUIS G. WINKLER, OF INDIANAPOLIS, INDIANA, ASSIGNORS TO PARTS CORPORATION, OF INDIANAPOLIS, INDIANA, A CORPORATION.

UNIVERSAL MOUNTING.

Application filed October 17, 1925. Serial No. 63,067.

This invention relates to a bracket for a rear view mirror of the type generally employed in connection with automobiles or similar vehicles. The invention comprises a feature thereof which is applicable to other uses wherein it is desired to employ a universal mounting.

The principal object of the invention is to provide a universal mounting of a relatively economical and simple character formed of two complementary sheet metal stampings as will be hereinafter more fully set forth and described.

The full nature of the invention will be understood from the accompanying drawings and the following description and claims.

Fig. 1 is a rear elevation of the bracket with the mirror attached thereto. Fig. 2 is a side elevation thereof. Fig. 3 is a top plan view taken on the line 3—3 of Fig. 2. Fig. 4 illustrates the parts in position to be assembled. Fig. 5 is a view of the two complementary stampings forming the universal mounting in position to be assembled.

In the drawings there is shown a rear view mirror 10 adapted to be rigidly secured to the bracket by the edge engaging clamping members 11 and 12 which are secured together in clamping position by the bolt 13. The member 12 has a pair of ears 14 stamped therefrom so as to extend rearwardly at right angles in spaced relation as shown in Figs. 2 and 4.

The bracket is supported from the vehicle by the metal strap 15 having a screw hole 16 for permitting it to be screwed directly to the interior of a closed vehicle, and provided with a slot 17 through which the clamping member 18 may pass for clamping it over the top of a windshield of an open vehicle through the medium of the screw 19.

The strap 15 is provided with a longitudinally extending slot 20 for receiving the bolt 21 and slidably clamping the bifurcated member 22 in adjusted position.

The mirror is supported in adjusted position by the strap 15 through the medium of the universal mounting comprising the members 23 and 24. Said members consist of the sheet metal stampings 23 and 24 which are identical in shape, size and formation and are bent U-shaped as shown in Fig. 5. Each of said members is provided with a bolt hole extending through the oppositely disposed arms so that when they are assembled they form a hollow block having the usual six sides provided with two bolt holes through which bolts may extend at right angles to each other as shown in Fig. 3. The bifurcated member 22 is adapted to straddle the sides of the mounting and is pivotally secured thereto by the bolt 25 extending through one of said bolt holes, and the ears 14 are adapted to embrace the top and bottom of the mounting so that the bolt 26 may exend vertically through the other bolt hole.

It will be observed by reason of the relative position of the bolt holes, the bolts will prevent the two members 23 and 24 from separating and will hold them in such relation as to provide a connection between the two parts of the bracket which will enable the mirror to be tilted up and down or sidewise. Whereas heretofore it has been the practice to provide a comparatively expensive and usually solid block, this invention permits of a lighter structure being employed in place thereof which serves the same purpose and which may be economically made of metal stampings. While the universal supporting member has been herein described as pertaining to a rear view mirror bracket, it is obvious that it is applicable in a similar manner to many other uses.

The invention claimed is:

1. A universal mounting comprising a pair of oppositely disposed U-shaped metal stampings, said stampings being provided with suitable bolt holes and associated together to form a hollow block.

2. A universal mounting consisting of a pair of sheet metal stampings, said stampings being of the same size, shape and formation, each of said stampings being U-shaped in formation with arms extending parallel to each other and spaced from each other substantially their width whereby said members may be associated together to form a hollow block-like structure.

3. A universal mounting comprising a pair of similarly formed U-shaped sheet metal stampings having bolt receiving holes formed in the arms thereof adjacent their outer ends, said arms being formed parallel and in spaced relation with each other substantially the same as their width so that upon assembling said members the edges of the arms of the respective members will abut each other so that said arms will provide the four sides of a hollow block and the intermediate body portions of said members will form the opposite ends thereof.

4. A rear view mirror bracket comprising a strap adapted to be secured to a support at one end thereof, said strap being provided with a longitudinal slot therein, a bifurcated bracket member slidably adjustable in said slot, a mirror supporting bracket having outwardly formed ears spaced from each other, and a universal mounting block comprising a pair of similarly formed U-shaped sheet metal members adapted to embrace each other so as to form a hollow block, said sheet metal hollow block being embraced by said ears and the arms of said bifurcated members so as to be pivotally connected at right angles thereto for providing a universal connection substantially as and for the purpose described.

5. A universal mounting comprising a rectangular sided hollow block formed from sheet metal, one pair of sides being formed from tongues bent to spaced parallel positions with respect to each other having aligned openings therethrough, and another pair of tongues bent to spaced parallel positions with respect to each other and having aligned openings therethrough, the openings in each pair of tongues being in different planes for receiving bolts disposed at right angles to each other.

In witness whereof, we have hereunto affixed our signatures.

BERT F. KELLY.
ROBERT F. MILLER.
LOUIS G. WINKLER.